March 30, 1965 D. O. SMITH 3,176,276

MAGNETIC DOMAIN-WALL STORAGE AND LOGIC

Filed May 31, 1962 4 Sheets-Sheet 1

INVENTOR.
Donald O Smith
BY Edward D. Thomas
AGENT

INVENTOR.

Donald O. Smith

BY Edward P. Thomas

AGENT

INVENTOR.
DONALD O. SMITH
BY
Edward D. Thomas
AGENT

MAGNETIC DOMAIN-WALL STORAGE AND LOGIC

Filed May 31, 1962

INVENTOR.
Donald O. Smith
BY Edward D. Thomas
AGENT

United States Patent Office 3,176,276
Patented Mar. 30, 1965

3,176,276

MAGNETIC DOMAIN-WALL STORAGE AND LOGIC

Donald O. Smith, Lexington, Mass., assignor to Massachusetts Institute of Technology, Cambridge, Mass., a corporation of Massachusetts Filed May 31, 1962, Ser. No. 199,113
6 Claims. (Cl. 340—174)

This invention relates to thin film magnetic data processing and more particularly to magnetic domain-wall storage and logic devices.

Present day large capacity data storage systems generally use magnetic storage devices which operate on the principle that if a given magnetic domain configuration is stable, so is the one which corresponds to a reversal in direction of all these domains. This principle is common to magnetic storage of binary information on drums, discs, toroidal cores, tapes or thin films. In such cases in which the storage mechanism is the direction of magnetization of the magnetic medium, magnetization in a particular direction determined by the geometry of the element may be assigned the significance of binary ONE and magnetization in the opposite direction the significance of binary ZERO. Such bistable magnetic devices have also found use for delaying and shifting information, usually in cooperation with circuit elements such as diodes which direct the flow of information in the desired direction.

The present invention has as its primary object the provision of a novel magnetic storage mechanism which permits a reduction in the amount of magnetic material involved with a reduction in space and power for a given amount of stored information. A further object is to provide a magnetic media suitable for logical operations.

These and other objects of the invention are achieved through the use of thin strips of magnetic film material in which information is stored as the sense of magnetic rotation within the domain walls separating adjacent magnetic domains having opposed directions of magnetization. Local magnetic fields are employed to inject magnetic domains into the strip material so that the magnetization within the interdomain walls is given a predetermined sense of rotation. Local magnetic fields are also employed to shift the position of injected domain walls along the strip to new locations in successive steps by a controlled amount. The invention also contemplates combining thin strips of magnetic film material interconnected in predetermined arrangements to provide a basis for logic operations by the controlled shifting of data through the interconnections and subsequent interaction between domain walls.

The invention likewise involves several features and details hereinafter described and illustrated in the accompanying drawing showing the invention in preferred embodiments wherein.

Figure 1A:
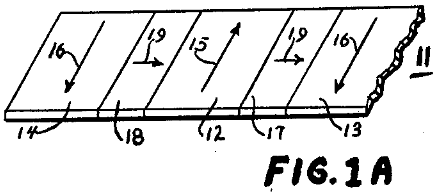
FIGURES 1A and 1B illustrate domain wall storage.

The concept of a domain wall in a ferromagnetic material is illustrated in FIGURE 1 where a strip 11 of magnetic film material is assumed to have been treated to obtain an easy axis of magnetization transverse to the length of the strip, i.e. preferentially to align the electron spin axis substantially perpendicular to the length of the strip. Following the application along the strip of a uniform strong magnetic field along the easy axis, a single magnetic domain may remain. If the magnetizing field along the entire length of the strip is reversed, the direction of magnetization of the entire strip is reversed. If a local reversing field is applied, only a local intermediate region will reverse its orientation and the result is a magnetic domain 12 lying between domains 13 and 14 and having a direction of magnetization shown by arrows 15 opposed to the initial direction of magnetization shown by arrows 16; the boundaries between regions 14 and 12 and between regions 13 and 12 are represented by interdomain walls 17 and 18 of finite thickness. Centrally of the finite wall thickness the electron spin axes are represented by arrows 19 perpendicular to the easy axis of the strip while on either side they conform to the mutually opposed orientation of respective bordering domains. Accordingly, intermediate the two sides of the interdomain wall, the electron spin axes assume every transitional position required for a 180° reversal of direction.

Figure 1B:
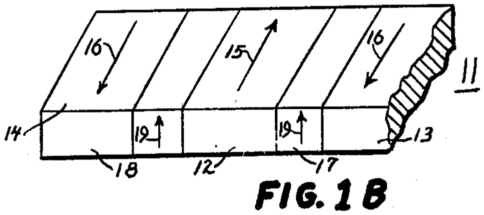

In viewing the transitional positions within wall 17 as a rotation from domain 13 to domain 12, the sense of domain wall rotation is counter-clockwise. However, the rotation from domain 12 to domain 14 within wall 18 is in a clockwise sense. It is this sense of rotation within the interdomain wall which is controlled in the present invention and used for information storage.

Where two domains such as 12 and 13 are uniformly magnetized in opposite directions and are separated by a magnetic wall such as 17 in which the magnetization is rapidly varying in direction, there are two limiting cases of the spatial variation within the walls. In FIGURE 1A the interdomain magnetization rotation is in the plane of the film and perpendicular to the wall. This is known as Néel type wall and it occurs in films having a thickness in the region of 200 A. In FIGURE 1B the interdomain magnetization rotates in the plane of the wall. This is known as a Bloch wall which occurs in films having a thickness in the region of 2000 A. For film thicknesses intermediate these values, the wall spin axis orientation may become complicated, as is the case with the "cross-tie wall" described by Huber, Smith and Goodenough, in a paper, "Domain Wall Structure in Permalloy Films," Journal Applied Physics 29, 294, 1958.

While the following description illustrates the use of the Néel wall in practicing the invention, since both the Néel wall and Bloch wall demonstrate that the domain wall rotation can be in either a clockwise or a counter-clockwise sense, the principles involved are equally applicable to the Bloch walls and the use of other type walls is not precluded.

In order to be useful as a storage medium, walls of known sense must be injected into the magnetic film, the stored information must be shifted in order to proceed with the storage of information, and a method of extracting the stored information from the magnetic film is required.

Referring now to FIGURE 2, the method of injecting domain walls of controlled sense of rotation into a thin film magnetic storage element is illustrated in diagrammatic form. As specified previously, strip 11 of magnetic film material is assumed to have been treated to have an easy axis of magnetization, A, transverse to the length of the strip with a remanent magnetization in the direction of arrows 16 and to have a thickness such as to acquire Néel walls. A conductor 21 is shown lying above strip 11 at an angle of approximately 60° to the easy axis of magnetization and electrically insulated from strip 11. A current flowing through conductor 21 in the direction indicated by arrows 22 will produce a magnetic field at the strip which is in the direction indicated by arrows H. Thus input current to conductor 21 has been given a direction such that the field produced by leg 23 is in the proper direction to reverse the magnetization locally in strip 11. The current is given a time duration and amplitude large enough to cause reversal of magnetization as indicated by arrows 15 in a discrete zone 12. Since leg 23 lies between legs 24 and 25 which produce fields opposite in direction to the local field of leg 23, it is evident that the strength of the magnetic field of leg 23 diminishes with distance along strip 11 and becomes zero at two regions 17 and 18 lying between leg 23 and legs 24 and 25. In transition regions 17 and 18 the electron spin axes assume energy transitional position required to execute the reversal of magnetization as shown by the arrows placed thereon.

Figure 2A:
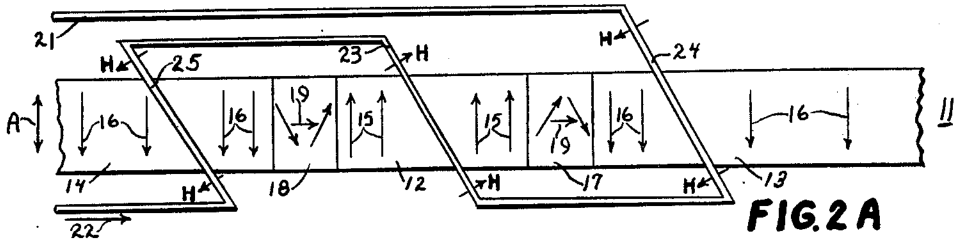
FIGURES 2A through 2D illustrate domain wall injection.
Figure 2B:
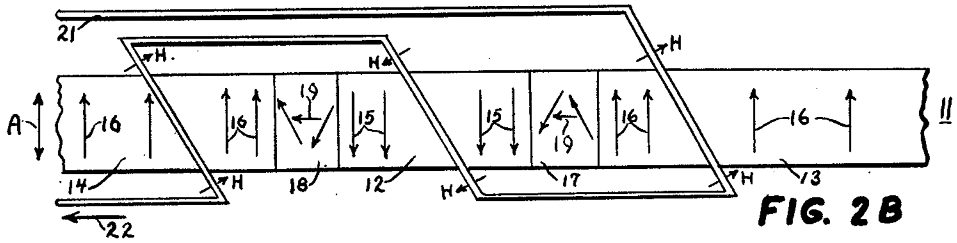

FIGURES 2A and B illustrate two possible states of remanent magnetization in strip 11 and the direction of current flow in conductor 21 required to inject domain walls therein. It is to be noted that the sense of rotation of the electron spin axes is in the same counter-clockwise direction going from domain 13 to domain 12 through wall 17 in both cases. In like manner, it is evident that the same clockwise sense of rotation is found in wall 18 going from domain 12 to domain 14. Thus, it is established that the same sense of rotation of the magnetization within the domain walls 17 and 18 is obtained by energizing conductor 21 with a current flowing in the proper direction to produce a local field having a direction to reverse the magnetization in a discrete local zone of strip 11, regardless of the initial direction of magnetization in strip 11. In other words, if the convention is adopted always to scan strip 11 from right to left as viewed in FIGURE 2 and to call a counter-clockwise wall negative N and a clockwise wall positive P, the conductor 21 will always inject an interdomain rotation having the significance N when energized to cause domain 12 to be reversed in magnetization from the magnetization in domain 13.

Figure 2C:
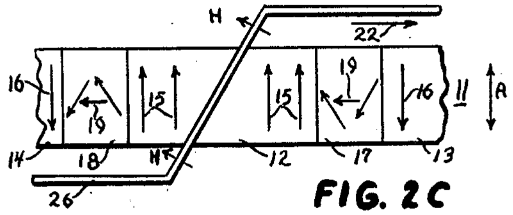
Figure 2D:
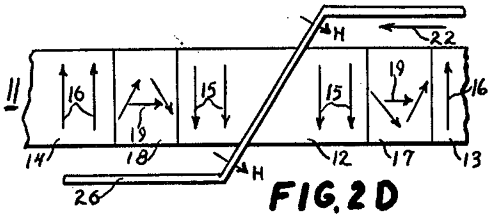

In order to change the sense of interdomain rotation with local domain injection, it is necessary to change the orientation of the conductor with respect to the strip 11 as is shown in FIGURES 2C and 2D wherein only the center leg is shown for the sake of simplicity. In this case, current flow as shown by arrows 22 in a direction to cause domain injection in strip 11 will introduce wall 17 as a "P" wall.

This means that the orientation of the conductor with respect to the strip controls the sense of the interdomain wall rotation which is obtained when the conductor is energized to produce domain injection and the direction of current flow in a selected conductor in order to obtain domain injection is specified by the previous operation performed on the magnetic material of the strip.

Assuming that conductors 21 and 26 occupy the same position in space and that the strip 11 can be moved in discrete steps with respect to conductors 21 and 26 so that the position of zone 12 is moved to the place of zone 13 and zone 14 to the place of zone 12 and so on; then binary information can be stored in strip 11 as a pattern of closure domains magnetized in alternate directions, the sense of rotation of the interdomain walls representing the information being controlled by energizing conductors 21 for "N" and conductors 26 for "P." The regular pattern of alternately magnetized domains carries no information but merely serves to space the information stored in the walls; a pattern of information NPNNPP is shown in FIGURE 3A, scanning from right to left. Here strip 11 is shown with a number of domains with a pattern of alternate directions of magnetization shown by arrows spaced by domain walls identified as P or N in accordance with the stored information. Within domain walls the electron spin axes in the center part of the wall are represented by arrows.

Rather than moving strip 11 physically with respect to conductors 21 and 26, the pattern of alternately magnetized domains can be propagated through the magnetic film by the application of local magnetic fields strong enough to move domain walls but too weak to inject domain walls. In order to shift the information to the right, local magnetizing fields H in the vicinity of the domain walls and having directions shown by the arrows as shown in FIGURE 3B are provided. Under the influence of the local fields, a force is exerted which will move the domain walls to the right to the stable position of $H=0$ as shown in FIGURE 3C. Then in the same manner, a second local field configuration as illustrated by FIGURE 3D, is provided to produce a second shift of the domain walls to the right as shown in FIGURE 3E. FIGURE 3F represents the next local field configuration to continue shifting the domain walls to the right. Since the propagating fields are below the initial value to establish new domains, the information pattern is caused to move in discrete steps along the strip. Obviously the direction of information flow can be reversed by reversing the field polarity shown in FIGURES 3B, C and F.

Figure 4:
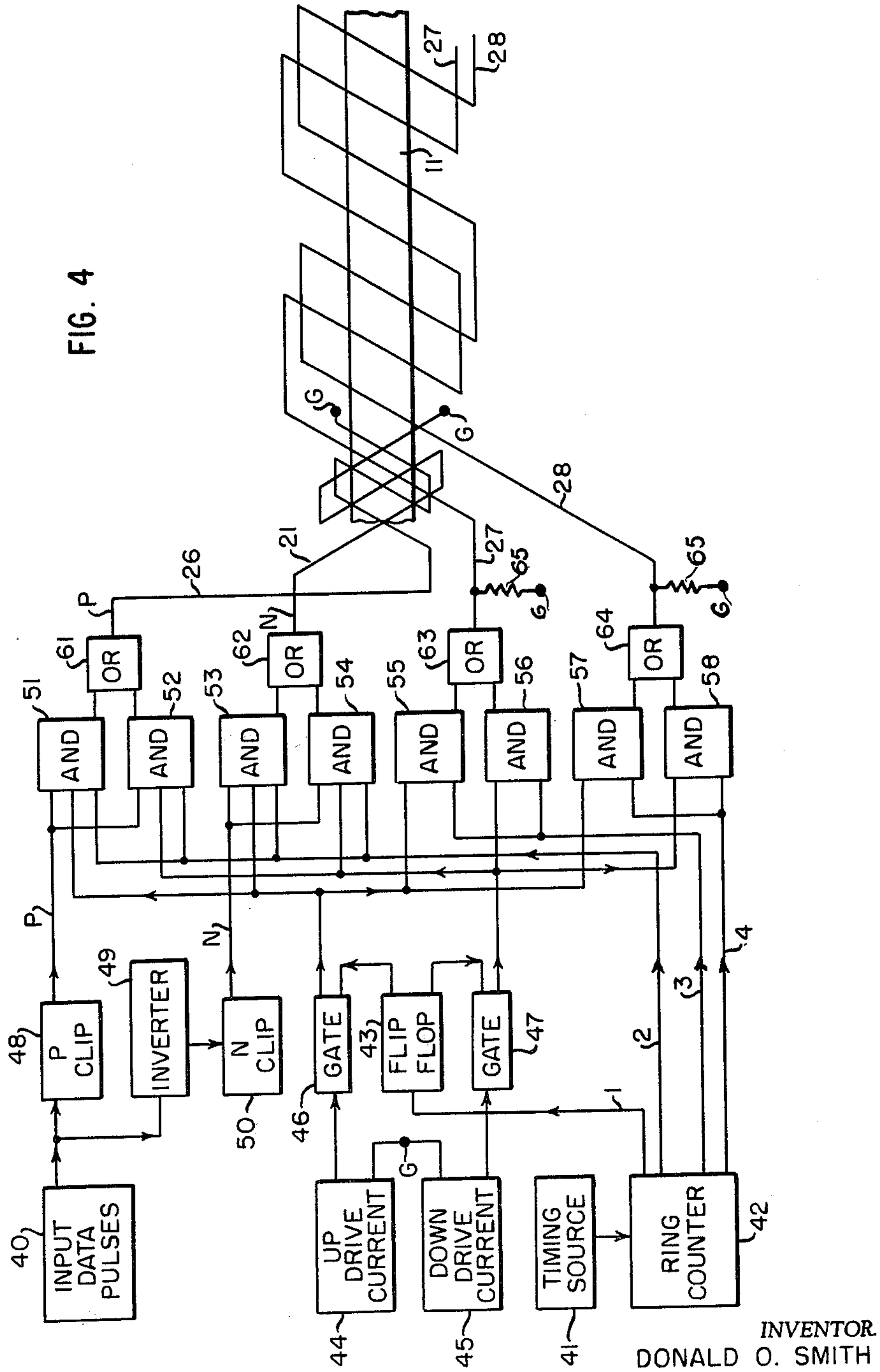
FIGURE 4 illustrates the schematic diagram of a circuit for the storage of binary information.

A practical scheme for obtaining the required local field patterns to perform the operations of "writing" or "read-in" and "shifting" is shown in FIGURE 4 which is a schematic diagram. A top view of the ferromagnetic strip 11 is shown. This is a thin film of magnetic material, such as permalloy, deposited to a thickness of approximately 100 A. on a substrate (not shown in the interest of simplicity). As in FIGURE 2, winding 21 is provided to inject domain walls in the controlled sense to signify the digit N and winding 26 is provided to inject domain walls to signify the digit P. Windings 21 and 26 are insulated electrically from each other and the film strip 11. Although ground connections are omitted from FIGURE 4 in the interest of simplicity, windings 21 and 26 are shown terminated at points G which are understood to join point G connected to drive current sources 44 and 45. The two shift windings 27 and 28 are placed in nearby planes parallel to the film plane and are extended the entire length of strip 11 although only the input to the strip 11 is here illustrated.

Figure 3:
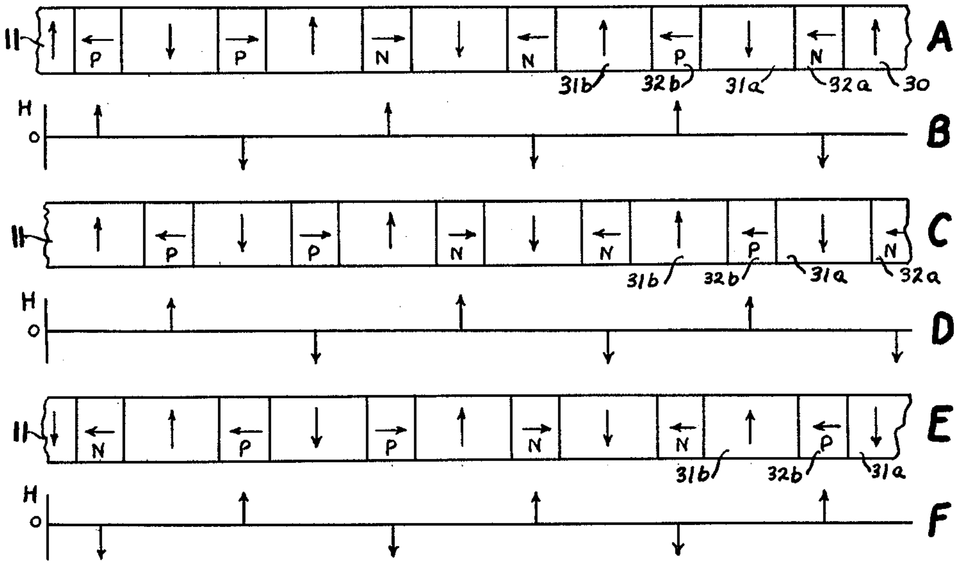
FIGURES 3A through 3F illustrate domain wall shifting.

To illustrate the sequence of operation of this circuit the writing and shifting of the pattern of information PNNPP shown in FIGURE 3 will be described. Referring back to FIGURE 4, a source of timing pulses 41 to control the sequence of operations is shown connected to a ring counter 42 to provide a four step operation by applying pulses to leads 1, 2, 3, 4 in response to successive input pulses from pulse source 41. The presence of a pulse on lead 1 of counter 42 triggers flip-flop 43 so that either gate 46 or gate 47 is energized alternately. Since the write windings 21 and 26 and the shift windings 27 and 28 require current flow in both directions alternately, "UP" drive current source 44 and "DOWN" drive current source 45 are provided. "UP" and "DOWN" are adopted to signify the direction of current flow in the several windings 21, 26, 27, 28 which produce magnetic fields in "UP" and "DOWN" directions according to the diagrams of FIGURE 3. The output of gate 46 is fed to "AND" gates 51, 53, 55, and 57, while the output of gate 47 is fed to "AND" gates 52, 54, 56, and 58. Input data pulses from source 40 are fed directly through level clip circuit 48 to "AND" gates 51 and 52 and through inverter 49 through level clip circuit 50 to "AND" gates 53 and 54.

Assuming that the region of strip 11 beneath the write windings 21 and 26 has been placed in a magnetized state so that the direction of magnetization is in an "UP" direction, as in domain 30 of FIGURE 3A, and that a pulse on line 1 has triggered flip-flop 43 to render gate 46 conducting, then a pulse on line 2 will be applied to "AND" gates 51, 53, 55, and 57. However, the first pulse of data is an "N" so that only gate 53 is energized by a data pulse "UP" drive current and a timing pulse simultaneously. Consequently, the "UP" drive current is applied through "AND" gate 53 and "OR" gate 62 to write winding 21. A domain 31*a* is thereby injected in strip 11 and the domain wall 32*a* between domain 30 and domain 31 is given a clockwise sense of rotation.

The third timing pulse on line 3 of counter 42 is applied to "AND" gates 55 and 56. "UP" drive current is, therefore, applied through gate 55 and "OR" gate 63 to winding 27 in a direction to move domain wall 32*a* to the right along strip 11 to a position beneath winding 28.

The fourth timing pulse on line 4 of counter 42 is applied to "AND" gates 57 and 58. "UP" drive current is now applied through gate 57 and "OR" gate 64 to winding 28 in a direction to move domain wall 32*a* a second step to the right along strip 11.

As noted earlier, the fields required to shift domain walls may be lower in intensity than the fields employed to inject domains, so resistors 65 are shown shunting shift windings 27 and 28 as a reminder that windings 27 and 28 are driven to produce lesser local field intensities if the same current drive source is used for the "write" and "shift" operations.

The next timing pulse appears on line 1 of counter 42 to trigger flip-flop 43 which in turn energizes gate 47 and makes gate 46 non-conducting. The sequence of operations can now be repeated with current flow in the "DOWN" direction. The next data pulse being P will not actuate inverter 49 and clip 50, but will be conducted directly through clip circuit 48 to gates 51 and 52. Gate 52, when energized by a pulse on lead 2, the P data pulse and "DOWN" current source 45 will apply a current to write winding 26 through "OR" gate 62 to inject domain 31*b* with a magnetization in the "DOWN" direction and having a domain wall 32*b* with a counter-clockwise sense of rotation. When lead 3 is energized domain walls 32*a* and 32*b* are both shifted again to the right by the "DOWN" current in shift winding 27 and energization of lead 4 in turn advances domain walls 32*a* and 32*b* one more step along strip 11 to the right.

Pulsing line 1 of ring counter 42 now triggers flip-flop 43 to change drive current sources back to "UP." The sequence of operations is then repeated. Briefly, the sequence is: (1) reverse the drive current flow, (2) write information, (3) shift all stored data one step to make room for the next bit of data, (4) shift all stored data to make room to shift the next bit of data. In the manner described above, the remaining N, P and P data pulses are stored by alternate directions of current flow in windings 21 and 26 respectively and the stored data is shifted to obtain the pattern of FIGURE 3A in which alternate domains are magnetized in alternate directions and the stored information is carried by the sense of rotation of the interdomain walls.

It may also be noted that it is possible to write and shift at the same time during one of the shift operations. The sequence of operations may then be thought to be: (1) shift all stored data one step to the right to clear the write zone, (2) reverse the direction of current flow, (3) write next data bit and shift all previously stored data; back to (1) shift all stored data including that just previously injected, etc.

It is obvious that the required sequence of switching operations can be obtained in a great variety of circuitry well known to the computer and communications field and that mechanical switches or relays can serve the purposes where high speed of operation is not needed.

In connection with FIGURE 4, by way of example, strip 11 may be 0.005" wide and placed on a substrate 1.0" long. Windings 21, 26, 27 and 28 are limited at present to the resolution which etched wiring techniques permit, conductors of the order of 0.005" spaced by 0.005" are readily obtained. This permits current density in the conductor which is more than ample to develop the local fields of the order of 2 oersteds which are required to inject domains and to shift domains.

Under those conditions, the domain walls are found to be of the order of one micron spaced by domains whose size 0.005" corresponds to the conductor. The time required to inject domains is of the order of 10–50 millimicroseconds while the time to shift domain walls, of the order of 200 millimicroseconds, limits the speed of operation.

It is evident that the dimensions used to illustrate the embodiment are not inherent limitations of the process of storing information by means of the controlled sense of domain wall rotation but rather are limitations of the techniques readily available by which the process is demonstrated. Indeed, the magnetic domain wall storage process is visualized as providing the maximum ultimate information storage capacity obtainable in magnetic materials.

It is further evident that the ring counter 42 may be provided with any desired number of output leads to provide for additional timed operations which may be performed on the stored data at specified times and places as will be discussed later; and that once the stored data has been shifted along strip 11 out of the influence of the write windings 21 and 26, certain operations may also be performed on the stored data at the same time that data is being written.

Figure 6:
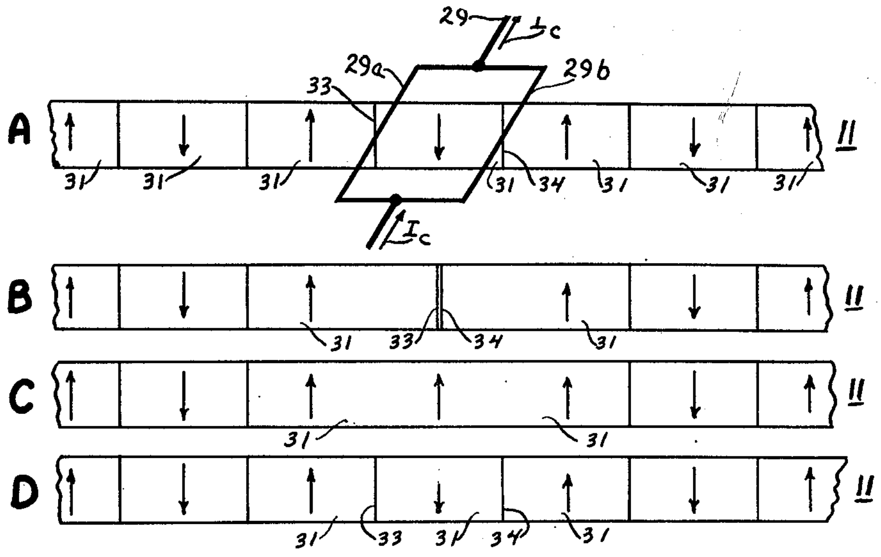
FIGURES 6A through 6D illustrate the process of addition and erasure of stored data.

Once the operations of injecting domain walls of controlled sense and of shifting the position of the domain walls along the strip are made available, then it becomes possible to make use of other properties of domain walls to manipulate the stored information to perform logical operations. One of these takes advantage of the fact that two domain walls of opposite sense if moved together will destroy (unwind) each other; however, walls of the same sene when brought together do not necessarily destroy each other, but can form a double wall which can subsequently be separated again into two single walls. Thus, erasure occurs on condition that the walls have opposite sense. An illustration of conditioned erase is shown in FIGURE 6. In FIGURE 6A, strip 11 is shown magnetized alternately in an up-and-down pattern of closure domains 31. The "erase" winding 29 is shown such that leg 29*a* lies above domain wall 33 and leg 29*b* lies above domain wall 34. For the domain orientation shown, the application of a current pulse to winding 29 in the direction shown by the arrow $I_c$ will cause domain walls 33 and 34 to be brought together. In FIGURE 6B the case of the two similar walls is illustrated and in 6C the case of two dissimilar walls is shown. If now a current pulse in the opposite direction is applied to winding 29, similar walls 33 and 34 are restored to the original pattern configuration and there has been no change in the stored information, as is shown in FIGURE 6D. When the walls 33 and 34 are dissimilar, they destroy each other when brought together and the subsequent pulsing of winding 29 has no effect on the pattern of FIGURE 5C so that the information stored in walls 33 and 34 is erased from the strip 11. This operation may be called "conditional erase" since erasure occurs only if dissimilar walls are brought together.

"Unconditional erase" requires that two adjacent walls such as 33 and 34 be removed regardless of sense. This can be accomplished by driving winding 29 with a current large enough to produce the much larger field needed (of the order of 10.0 oersteds) to eliminate domain walls of the same sense. This is an adequate operating margin between the operations of conditional and unconditional erase.

The use of algebraic summation to perform logic is commonly called "majority logic." In general, the majority organ is assumed to have an odd number of inputs, and an output which is the same as the majority of inputs. Table I sets out the definition of the logical functions "AND" and "OR."

*Table I*

| X | Y | AND | OR |
|---|---|---|---|
| P | P | P | P |
| N | P | N | P |
| P | N | N | P |
| N | N | N | N |

Assume three inputs to the majority organ to be X, Y, and Z and give Z a fixed value N. As shown in Table II, the output is seen by inspection to be the "AND" of Table I.

*Table II*

| X | Y | Z | Output |
|---|---|---|---|
| P | P | N | P |
| N | P | N | N |
| P | N | N | N |
| N | N | N | N |

Let Z have the constant value P and the corresponding output is shown by Table III to be "OR."

*Table III*

| X | Y | Z | Output |
|---|---|---|---|
| P | P | P | P |
| N | P | P | P |
| P | N | P | P |
| N | N | P | N |

It has already been implied in discussing conditional erase that the wall rotations add algebraically. It was pointed out that, when two walls of opposite sense are brought together, the resultant is destruction or unwinding the rotation back to zero. When two walls of the same sense are brought together, a double or 360° wall is formed which is separable again.

Summation of any number of wall rotations can be accomplished by applying successive fields to the walls in alternating UP and DOWN directions. The final result is to leave only one wall or an odd numbered group of walls which have the same rotational sense as the initial majority. If more than one wall is left, the operation of unconditional erase can eliminate all but one wall.

Figure 5:
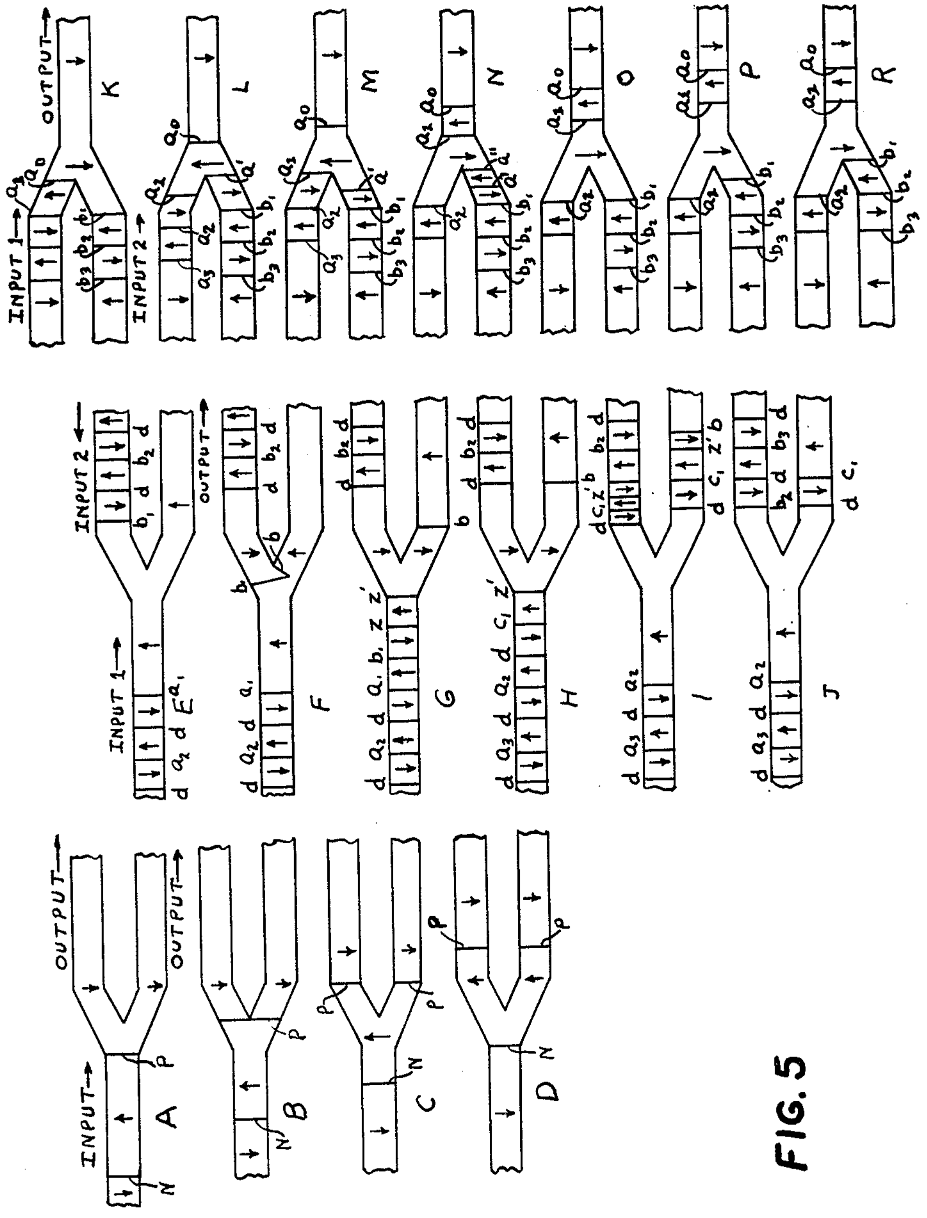
FIGURES 5A through 5R illustrate the processing of stored data.

The processing of data also requires the operation of transferring data from a single channel into two channels, called "fan-out" and the mixing of data from two channels into a single strip, called "fan-in." Fan-out is accomplished as shown in FIGURES 5A-D in which an arbitrary pattern of domain walls, indicated as P and N, are spaced by the usual sequence of domains alternately magnetized in opposite directions as shown by the arrows placed therein. As the domain walls are shifted to the right by the application of local fields, as shown in FIGURES 5B, 5C, and 5D, two walls appear, one in each of the output channels; the energy to create the additional length of domain wall is generated by energy taken from the current in the shift windings. The exact orientation of the shift windings in order to maintain the required direction of magnetic field through the Y-shaped junction may require the use of auxiliary shift windings to procure a resultant field in a desired direction. Since this is merely a matter of design involving the exact configuration of magnetic strips employed, the details are not considered necessary to an understanding of the principle of fan-out.

Fan-in can be accomplished in two different ways. In FIGURES 5E–J, one input is on the right and the other is on the left, asymmetrical fan-in, while in FIGURES 5K–R, both inputs are on the left, symmetrical fan-in. The essential difference between the two lies in the arrangement of shift windings to transfer the domain walls through the Y junction region. The asymmetrical fan-in junction may require a less complex control winding system and in addition may lend itself more readily to subsequent logical operations.

Fan-in is somewhat more difficult to execute since the regular sequence of up-and-down domains must be preserved. In order to do so, it appears necessary to transfer walls in pairs from either input channel to the output channel. In asymmetrical fan-in, one of these walls is a "dummy" in that its sense is arbitrary, while in symmetrical fan-in, both walls carry information.

FIGURES 5E through 5J show a sequence of operations using asymmetrical fan-in. FIGURE 5E indicates that the input data on channels 1 and 2, $a_1$, $a_2$, etc., and $b_1$, $b_2$, etc is augmented by the inclusion of dummy walls *d*. In FIGURE 5F, the first data wall $b_1$ is shown shifted to the left across the junction with the formation of an auxiliary wall *b*. In FIGURE 5G, after the transfer of wall $b_1$ completely through the junction, wall *b* will be placed in the output channel while wall $b_1$ has been shifted into input channel 1. If now the logical operation walls Z and Z′ are injected into input channel 1, a majority summation can be performed by conditional erase and unconditional erase operations on walls $a_1$, $b_1$, and Z to yield the result of the logical operation as wall $c_1$ in FIGURE 5H. Movement of Z′, $c_1$ and *d* across the junction to the right results in fan-out of these walls and, consequently, these walls appear both in the input 2 channel and the output channel. Finally, the unwanted walls *d*, Z′, $c_1$ and *d* in the input channel 2 and unwanted walls *b* and Z′ in the output channel are unconditionally erased as shown in FIGURE 5J. This data wall configuration has the same form as the initial one of FIGURE 5E and hence the fan-in can be carried out on the next input data. The injected walls Z and Z′ can have the sense P–N to produce an "AND" junction or N–P to produce the "OR" function.

The symmetrical fan-in operation is similar in many respects to the asymmetrical case. FIGURE 5K is taken as the initial state; note that the "A" data is augumented by a dummy wall $a_0$. In FIGURE 5L the wall $a_0$ has been shifted to the right with the creation of wall *a′* at the junction. In FIGURE 5M the *a′* wall has been shifted to the left into the input 2 channel while the "A" data has been shifted to the right again with $a_0$ entering the output channel. In FIGURE 5N the "A" data is again shifted to the right and as wall $a_1$ crosses the junction wall *a″* is created. In FIGURE 5O the operation of unconditional erase removes unwanted walls *a′* and *a″* and the data in the output channel, $a_0$ and $a_1$ is shifted to the right. FIGURES 5P and 5R show the "*b*" data being shifted to the right into a position similar to the initial state of FIGURE 5K. The movement of walls $b_1$ and $b_2$ across the junction into the output channel with the creation of unwanted walls and their erasure is accomplished in a manner like unto that employed for "A" data. After $b_1$ and $b_2$ have been transferred, the cycle starts over again to mix the input data as required. The transfer of walls in pairs from inputs 1 and 2 is necessary in order to preserve the pattern of up-down spacer domains.

By the method described above, pairs of walls $a_1$–$b_1$, $b_2$–$a_2$, etc. can be formed in the output strip. At this time majority logic as described above can be performed on these pairs of walls to produce the "AND" or "OR" logical functions. However, there is an alternative sequence of operation which can be used to produce "AND" or "OR" as follows. The operation of "conditional erase" is performed to bring two domain walls (e.g., $a_1$–$b_1$) together and then apart. The data pattern is preserved if the two walls are similar and destroyed if the two walls are dissimilar. Next, a write operation is performed by applying a field having the proper magnitude to inject a domain in the case the domain walls had been destroyed and a direction such as to generate an N–P or P–N pair depending on whether the function "AND" or "OR" is described and on whether the left or right hand wall is to finally represent the result. In the case that the domain walls had not been erased, the write operation cannot change the domain walls since the write field is in a direction to preserve the domain pattern, and the original domain wall information pattern is unaffected. The same operations are not performed on the pair $b_2$–$a_2$ and finally, the extra pair of walls which have been generated, one from operating on $a_1$–$b_1$, and one from operating on $b_2$–$a_2$, are erased unconditionally.

Figure 7:
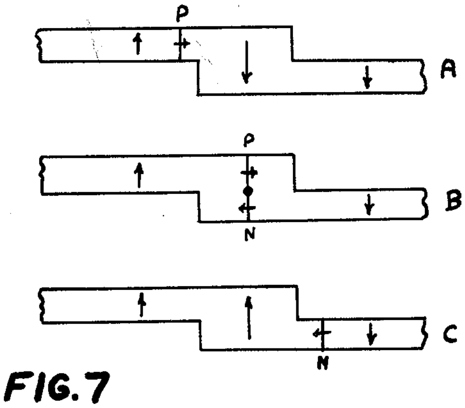
FIGURES 7A through 7C illustrate complementation.

While digital computer logic can be carried out with logical "AND and "OR" functions, complementation often simplifies the computation. There seems to be a fairly critical relationship between magnetic film thickness and width in which a Néel wall entering a wide region can become two Néel segments in order to minimize the magnetostatic energy associated with the wall. This is analogous to the local flux closure generated in cross-tie walls as described by Huber et al. in the paper cited above. FIGURES 7A, B, and C represent successive steps illustrating complementation in which the lower Néel segment is the complement of the upper.

The reading operation to detect the sense of rotation of magnetization of the domain wall can be accomplished in several ways. A pick-up loop wound around the strip along the direction of the easy axis of magnetization is oriented to be unaffected by the domains as they are shifting and to sense directly the average direction of magnetization within a moving wall. This method presents two difficulties: first, the loop should be made of a conductor having a width of the order of the wall thickness, about $10^{-4}$ cm.; and second, the small number of spins in a wall produces a very small signal. A second method involves injecting an auxilary wall with a predetermined sense, performing a conditional erase between the data wall and the auxiliary wall, and subsequently reading the resulting domain pattern by inductive pick-up methods. The well-known Kerr magneto-optical effect is still another technique for observing domain patterns.

While the preceding disclosure has been directed primarily to only a few illustrative embodiments of the present invention, it will be understood that the invention is not restricted to these examples. The system of magnetic domain-wall storage and logic uses spatial rotations of domain wall magnetization to code information and the algebraic addition of these rotations to perform logical functions. To those skilled in the art, the combination of logic elements to make systems containing a large number of storage and logical operations can be extrapolated from the examples given.

What is claimed is:

1. Data processing apparatus comprising, a strip of magnetic film material having an easy axis of magnetization substantially transverse to its length, a source of electrical data pulses in binary form, write windings connected to said source and magnetically coupled to one end of said strip for applying thereto a local switching field at an angle to said easy axis in the plane of said strip to inject domain walls therein having a predetermined sense of rotation of magnetization controlled in accordance with the sense of said data, means for applying local propagation fields in the plane of said strip along said easy axis in the vicinity of domain walls to shift the position of said walls along said tape through a predetermined zone, an erase winding spaced along said strip from said write winding and adapted when energized to apply local magnetic fields having the same direction simultaneously to two adjacent domain walls thereby bringing said adjacent walls together for one direction of current flow to cause algebraic summation of domain wall rotation, whereby like walls form a double wall of 360° rotation and unlike walls are returned to 0° rotation and for the alternate direction of current flow moving adjacent walls apart, and timing means for energizing said write windings said propagation means and said erase winding in a predetermined sequence whereby said data is stored and processed along said strip as the controlled sense of rotation of magnetization within domain walls which separate domain zones magnetized in alternate directions along said easy axis.

2. Data processing apparatus comprising, a strip of magnetic film material having an easy axis of magnetization substantially transverse to its length, a source of electrical data pulses in binary form, write windings connected to said source and magnetically coupled to one end of said strip for applying thereto a local switching field at an angle to said easy axis in the plane of said strip to inject domain walls therein having a predetermined sense of rotation of magnetization controlled in accordance with the sense of said data, means for applying local propagation fields in the plane of said strip along said easy axis in the vicinity of domain walls to shift the position of said walls along said strip through a predetermined zone, an erase winding spaced along said strip from said write winding and adapted when energized to apply local magnetic fields having the same direction simultaneously to two adjacent domain walls thereby bringing said adjacent walls together for one direction of current flow to cause algebraic summation of domain wall rotation, whereby like walls form a double wall of 360° rotation and unlike walls are returned to 0° rotation and for the alternate direction of current flow moving adjacent walls apart, and timing means for energizing said write windings said propagation means and said erase winding in a predetermined sequency whereby said data is stored and processed along said strip as the controlled sense of rotation of magnetization within domain walls which separate domain zones magnetized in alternate directions along said easy axis, and read-out means located at a point along said strip away from said write windings for detecting the sense of domain wall rotation as said domain wall is shifted past said read-out means.

3. Data processing apparatus comprising, a plurality of strips of magnetic film, each having an easy axis of magnetization substantially transverse to its length, said strips being arranged to meet at a common junction, a source of electrical binary data pulses, write windings connected to said source and magnetically coupled to said strips at points spaced along said strips away from said junction and adapted when energized to apply local switching fields to inject domain walls in the plane of said strips, said domain walls having a controlled sense of rotation corresponding to the sense of said data, means for applying local propagation fields in the plane of each strip in the vicinity of domain walls to shift the position of said walls along each strip through a predetermined zone, means for applying local propagation fields in the vicinity of said common junction to shift the position of domain walls across said junction from one of said strips to another of said strips, erase windings located in the vicinity of said junction and adapted when energized to eliminate unwanted domain walls by applying local fields thereto; auxiliary write windings located in the vicinity of said junction and adapted when energized to inject auxiliary domain walls of predetermined sense of rotation, and timing means for energizing said write windings for said plurality of strips, said strip and junction propagation means, said erase windings, and said auxiliary write windings in a predetermined sequence whereby data is stored, shifted, combined and processed to perform predetermined logic operations thereon.

4. Data processing apparatus comprising, a plurality of strips of magnetic film, each having an easy axis of magnetization substantially transverse to its length, said strips being arranged to meet at a common junction, a source of electrical binary data pulses, write windings connected to said source and magnetically coupled to said strips at points spaced along said strips away from said junction and adapted when energized to apply local switching fields to inject domain walls in the plane of said strips, said domain walls having a controlled sense of rotation corresponding to the sense of said data, means for applying local propagation fields in the plane of each strip in the vicinity of domain walls to shift the position of said walls along each strip through a predetermined zone, means for applying local propagation fields in the vicinity of said common junction to shift the position of domain walls across said junction from one of said strips to another of said strips, erase windings located in the vicinity of said junction and adapted when energized to eliminate unwanted domain walls by applying local fields thereto; auxiliary write windings located in the vicinity of said junction and adapted when energized to inject auxiliary domain walls of predetermined sense of rotation, timing means for energizing said write windings for said plurality of strips, said strip and junction propagation means, said erase windings, and said auxiliary write windings in a predetermined sequence whereby data is stored, shifted, combined and processed to perform predetermined logic operations thereon, and read-out means located along at least one of said strips at a point remote from said junction for detecting the sense of domain wall magnetization as said domain walls are shifted past said read-out location.

5. Data processing apparatus comprising, a current source, a binary data source of positive and negative electrical pulses, a thin film strip of magnetic material having an easy axis of magnetization substantially transverse to its length, a pair of write windings magnetically coupled to said strip, said pair of windings being arranged to cross said strip at opposite acute angles oriented with respect to said easy axis so that one of said pair of windings is adapted to apply a local switching field in the plane of said strip producing domain injection with an opposite sense of rotation of domain wall magnetization from that produced by the second of said pair of windings, means for energizing one of said pair of windings from said current source in response to positive pulses from said data source and energizing the second of said pair of windings from said current source in response to negative pulses from said data source to inject domain walls in said strip having a predetermined sense of rotation of interdomain wall magnetization controlled in accordance with the sense of said data pulses, means for alternating the direction of current flow in said write windings from said current source to provide for the injection of successive magnetic domains magnetized in alternate directions transverse to said length of said strip, means for applying local propagation fields in the plane of said strip along said easy axis in the vicinity of domain walls to shift the position of said walls along said tape, and means for energizing said write windings and said propagation means in a predetermined sequence whereby data is stored in said strip as the controlled sense of rotation of interdomain wall magnetization.

6. Data processing apparatus comprising, a current source, a binary data source of positive and negative electrical pulses, a thin film strip of magnetic material having an easy axis of magnetization substantially transverse to its length, a pair of write windings magnetically coupled to said strip, said pair of windings being arranged to cross said strip at opposite acute angles oriented with respect to said easy axis so that one of said pair of windings is adapted to apply a local switching field in the plane of said strip producing domain injection with an opposite sense of rotation of domain wall magnetization from that produced by the second of said pair of windings, means for energizing one of said pair of windings from said current source in response to positive pulses from said data source and energizing the second of said pair of windings from said current source in response to negative pulses from said data source to inject domain walls in said strip having a predetermined sense of rotation of interdomain wall magnetization controlled in accordance with the sense of said data pulses, means for alternating the direction of current flow in said write windings from said current source to provide for the injection of successive magnetic domains magnetized in alternate directions transverse to said length of said strip, means for applying local propagation fields in the plane of said strip along said easy axis in the vicinity of domain walls to shift the position of said walls along said tape, means for energizing said write windings and said propagation means in a predetermined sequence whereby data is stored in said strip as the controlled sense of rotation of interdomain wall magnetization, and read-out means located at a point along said strip remote from said write windings for detecting the sense of interdomain wall rotation as said domain wall is shifted past said read-out means.

References Cited by the Examiner

UNITED STATES PATENTS

| | | | |
|---|---|---|---|
| 2,872,663 | 2/59 | Kelner et al. | 340—174 |
| 3,068,453 | 12/62 | Broadbent | 340—174 |

IRVING L. SRAGOW, *Primary Examiner.*